US005117550A

United States Patent [19]

Nadeau et al.

[11] Patent Number: 5,117,550

[45] Date of Patent: Jun. 2, 1992

[54] METHOD OF MAKING A MIXING TOOL

[76] Inventors: James V. Nadeau; Erik J. Nadeau, both of 162 Blanchard Lake Rd., Whitefish, Mont. 59937

[21] Appl. No.: 619,386

[22] Filed: Nov. 29, 1990

[51] Int. Cl.[5] ........................ B22D 11/12; B23P 19/04; B01F 7/04

[52] U.S. Cl. ........................ 29/527.3; 29/460; 366/129

[58] Field of Search ........................ 29/460, 527.2, 527.3, 29/527.1, 527.4; 366/242, 342, 343, 344, 348, 603, 605; 264/45.1, 45.2, 45.3

[56] References Cited

U.S. PATENT DOCUMENTS

| | | | |
|---|---|---|---|
| 1,730,506 | 10/1929 | Hoffer | 366/343 X |
| 1,997,953 | 4/1935 | Van Der Kuy | 366/129 |
| 3,425,087 | 2/1969 | Fitzhugh | 366/129 X |
| 4,065,107 | 12/1977 | Van Horbek | 366/129 X |
| 4,215,628 | 8/1980 | Dodd, Jr. | 366/343 X |
| 4,350,445 | 9/1982 | Olsson | 366/129 X |
| 4,924,444 | 5/1990 | Castellanos | 366/129 X |

FOREIGN PATENT DOCUMENTS

| | | | |
|---|---|---|---|
| 1318545 | 6/1987 | U.S.S.R. | 366/342 |

*Primary Examiner*—Joseph M. Gorski
*Assistant Examiner*—Peter Dungba Vo
*Attorney, Agent, or Firm*—Leon Gilden

[57] ABSTRACT

A method of making a tool defined by an elongate shaft medially mounted to a paddle at its lowermost terminal end. The paddle includes an elastomeric body formed of a flexible memory retentent material, including reinforcing members mounted at each side and lower terminal end of the paddle to permit enhanced scraping and removal of fluid components from within a container during use. The organization includes a framework mounting the side blades, with the lower blades spaced from the framework subsequently encased by the elastomeric material.

4 Claims, 4 Drawing Sheets

METHOD OF MAKING A MIXING TOOL

BACKGROUND OF THE INVENTION

1. Field of the Invention

The field of invention relates a paddle apparatus, and more particularly pertains to a new and improved mixing tool wherein the same is arranged for scraping fluid contents from within a container such as for use in the stirring of pigments normally maintained in a colloidal suspension.

2. Description of the Prior Art

Various mixing and scraping paddles have been set forth in the prior art. Heretofore, however, the prior art has not provided an organization conveniently arranged in a manner as set forth by the instant invention. Such an example may be found in U.S. Pat. No. 3,325,627 to Adler, et al. wherein a spatula arranged for manual manipulation includes a central heating element directed therethrough.

U.S. Pat. No. 4,884,895 to Rodgers sets forth a paint stirring apparatus wherein an elongate handle includes a series of flexible elements mounted to a lower terminal end of the handle.

U.S. Pat. No. 4,350,445 to Olsson sets forth a paddle structure utilizing a kneading knife edge offset from the handle in an asymmetrical configuration.

U.S. Pat. No. 4,735,510 to Barbour, et al. sets forth a stirring organization set forth as a whisk, wherein a central handle includes a series of loops defining the whisk structure.

U.S. Pat. No. 4,575,255 to Kafka sets forth a kitchen appliance network mounting various stirring implements such as a whisk, a paddle, and the like.

As such, it may be appreciated that there continues to be a need for a new and improved mixing tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of mixing tool organizations now present in the prior art, the present invention provides a mixing tool wherein the same sets forth a method and apparatus for providing a mixing tool formed with scraping blades at the side and lower edges thereof mounted and encased in an elastomeric body of memory retentent material. As such, the general purpose of the present invention, which will be described subsequently in greater detail, is to provide a new and improved mixing tool which has all the advantages of the prior art mixing tools and none of the disadvantages.

To attain this, the present invention provides a method and apparatus including a tool defined by an elongate shaft medially mounted to a paddle at its lowermost terminal end. The paddle includes an elastomeric body formed of a flexible memory retentent material, including reinforcing members mounted at each side and lower terminal end of the paddle to permit enhanced scraping and removal of fluid components from within a container during use. The organization includes a framework mounting the side blades, with the lower blades spaced from the framework subsequently encased by the eleastomeric material.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Futher, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the teehnical disclosure of the application. The abstract is neither intended to define the invention of the application, which is measured by the claims, nor is it intended to be limiting as to the scope of the invention in any way.

It is therefore an object of the present invention to provide a new and improved mixing tool which has all the advantages of the prior art mixing tools and none of the disadvantages.

It is another object of the present invention to provide a new and improved mixing tool which may be easily and efficiently manufactured and marketed.

It is a further object of the present invention to provide a new and improved mixing tool which is of a durable and reliable construction.

An even further object of the present invention is to provide a new and improved mixing tool which is susceptible of a low cost of manufacture with regard to both materials and labor, and which accordingly is then susceptible of low prices of sale to the consuming public, thereby making such mixing tools economically available to the buying public.

Still yet another object of the present invention is to provide a new and improved mixing tool which provides in the apparatuses and methods of the prior art some of the advantages thereof, while simultaneously overcoming some of the disadvantages normally asciated therewith.

Still another object of the present invention is to provide a new and improved mixing tool wherein the same s arranged for selective securement to a structure for rotation or selectively may be manually manipulated for scraping various liquids from within a container, such as liquid pigments and the like.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
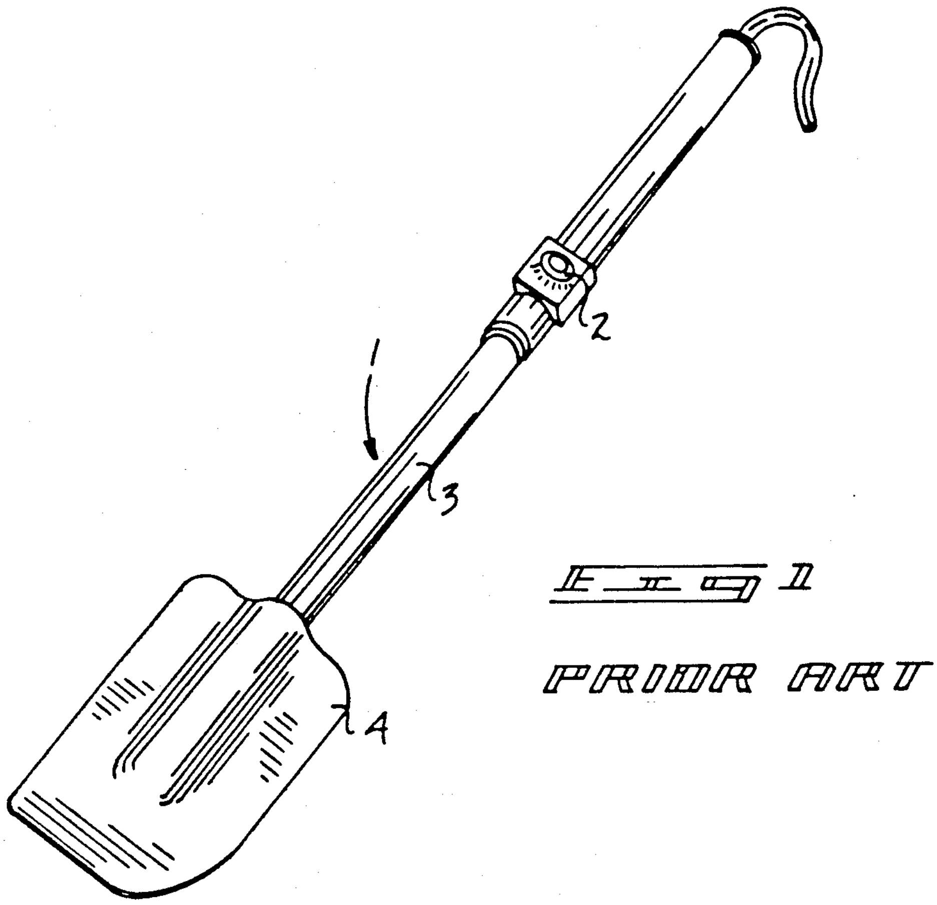
FIG. 1 PRIOR ART
FIG. 1 is an isometric illustration of a prior art mixing tool.

With reference now to the drawings, and in particular to FIG. 1 to 8 thereof, a new and improved mixing tool embodying the principles and concepts of the present invention and generally designated by the reference numeral 10 will be described.

Figure 2:
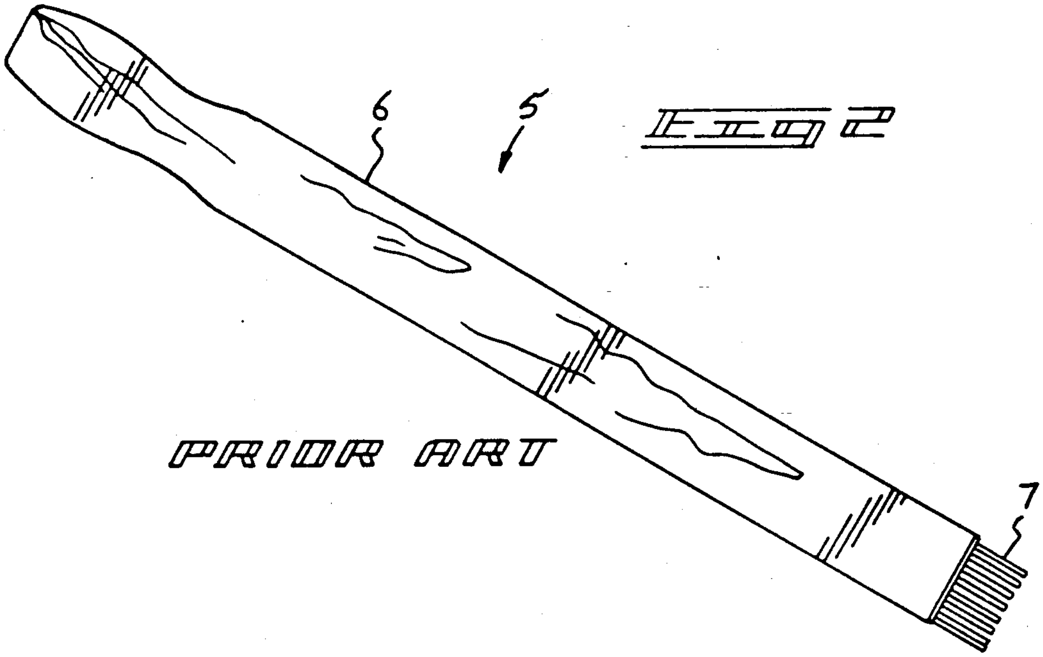
FIG. 2 PRIOR ART
FIG. 2 is an orthographic side view, taken in elevation, of a further example of a prior art mixing tool.

FIG. 1 illustrates a prior art mixing tool 1, wherein an elongate handle 3 includes a thermostat member 2 mounting a heating element therethrough to effect heating of the paddle structure 4 mounted at the lower end of the mixing organization, as set forth in U.S. Pat. No. 3,325,627. FIG. 2 illustrates a further example of a mixing structure 5, as utilized in the prior art, wherein an elongate handle 6 mounts a series of flexible members 7 at a lower terminal end thereof for use in the mixing and stirring of paint within a container, as set forth in U.S. Pat. No. 4,884,895.

Figure 3:
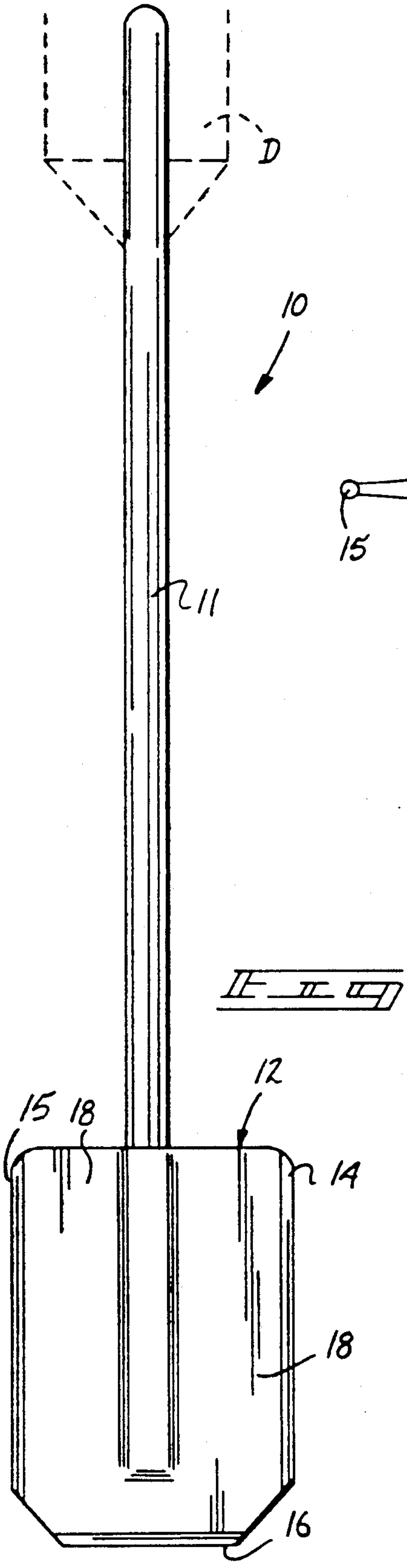
FIG. 3 is an orthographic view, taken in elevation, of the instant invention.
Figure 4:
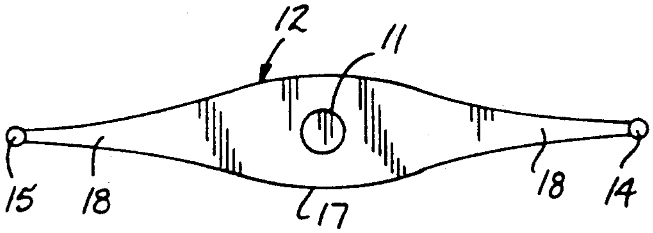
FIG. 4 is an orthographic top view of the instant invention.

More specifically, the mixing tool 10 of the instant invention essentially comprises a central shaft 11 that may be manually manipulated or fixedly mounted for rotation within a chuck of a drill structure "D", as illustrated in FIG. 3. The central shaft includes a semi-rigid paddle 12 mounted at a lower terminal end thereof, with the paddle 12 including a body formed of an elastomeric semi-rigid material of memory retentent characteristic. A respective right and left reinforcing rib 14 and 15 are coextensively positioned in a parallel relationship relative to one another at opposed right and left edges of the paddle 12 in a parallel relationship relative to one another and to the shaft 11, with the shaft 11 directed medially through the paddle 12. A bottom rib 16 is mounted to a bottom edge of the paddle 12 orthogonally relative to the right and left reinforcing rib edges 14 and 15 and spaced forwardly of the ribs 14 and 15. A main convex body portion 17 is formed about the shaft 11 and includes narrowed side portions 18 extending laterally and outwardly of the main body portion, with the ribs 14 and 15 formed to the terminal side edges of the side portions 18.

Figure 5:
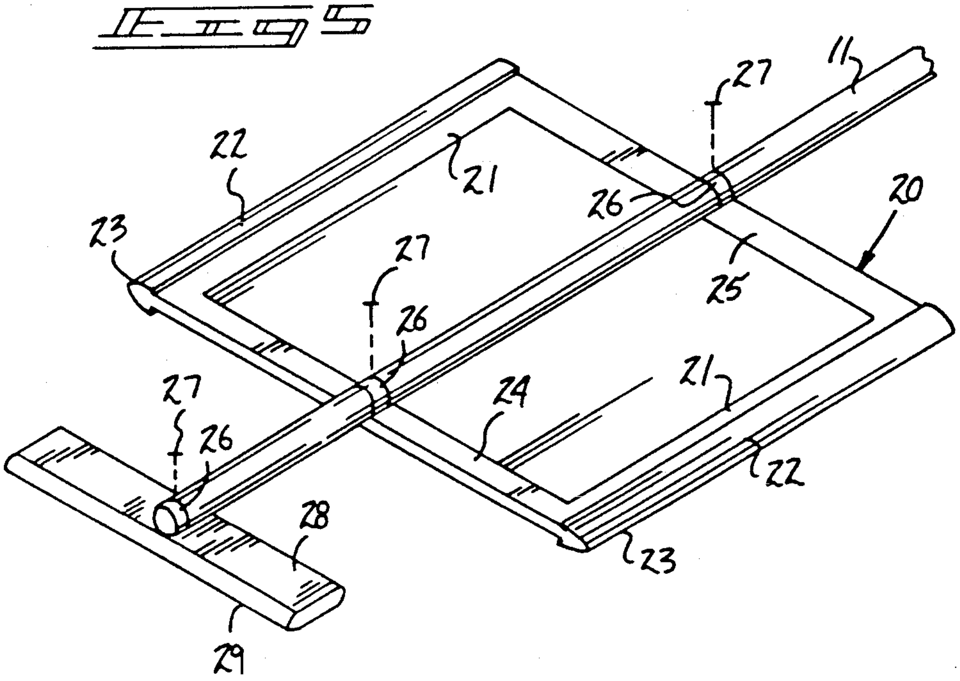
FIG. 5 is an isometric illustration setting forth an initial step in the construction of the instant invention.
Figure 6:
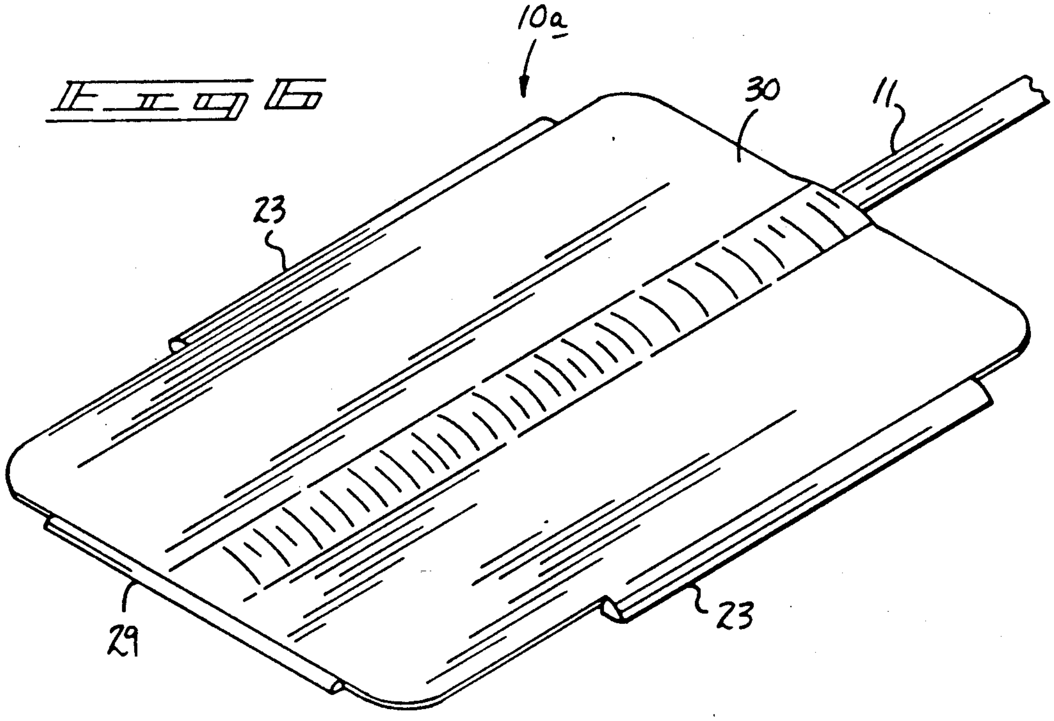
FIG. 6 is an isometric illustration of the instant invention with the elastomeric encasing defining the paddle structure.
Figure 7:
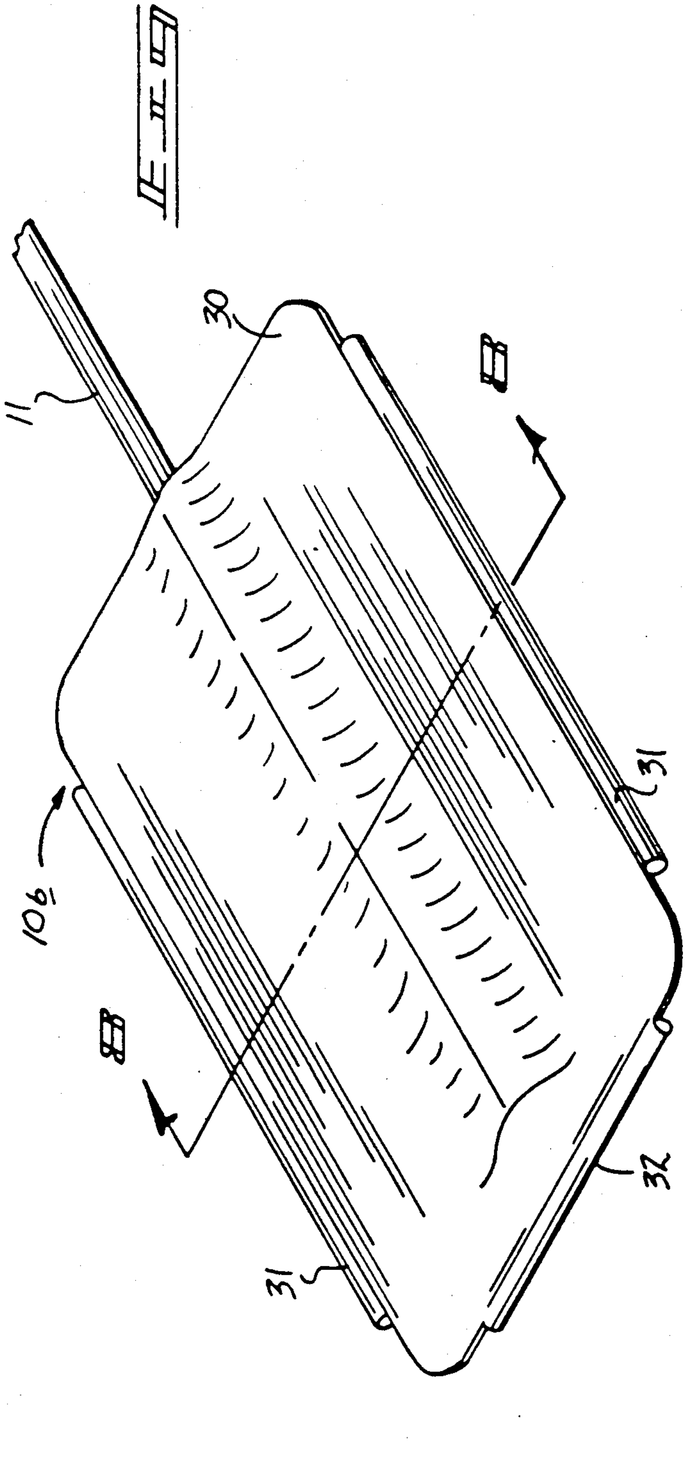
FIG. 7 is an isometric illustration of a modification of the instant invention.
Figure 8:
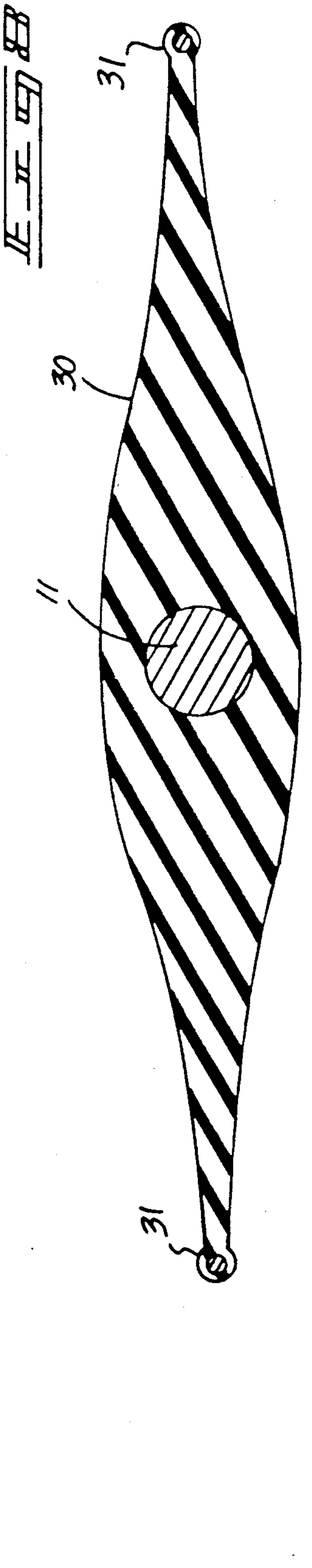
FIG. 8 is an orthographic view, taken along the lines 8—8 of FIG. 7 in the direction indicated by the arrows.

In producing the instant invention, a method utilized includes the formation of a rectangular, metallic framework 20 that includes vertical side rails 21 arranged parallel relative to one another and are mounted medially of the shaft 11 spaced from the lower terminal end of the shaft 11 in a parallel relationship. A scraper blade 22 is mounted coextensively with each side rail 21, with each scraper blade 22 including a laterally extending knife edge 23, wherein each of the knife edges 23 are parallel relative to one another, as illustrated in FIG. 5 for example. A lower horizontal rail 24 and upper horizontal rail 25 completes the rectangular framework 20. A bottom scraper blade 28 is mounted adjacent the lower terminal end of the shaft 11, with the bottom scraper blade 28 arranged parallel to the lower and upper horizontal rails 24 and 25. Further, a securement band 26 is mounted about the lower terminal end of the shaft 11 and includes a fastener 27 directed through the band and into the shaft 11 to mount the bottom scraper blade 28 to the shaft 11. In a like manner, a securement band 26 is mounted about each of the upper and lower rails 25 and 24, including a fastener 27 directed therethrough to secure each of the bands and the associated upper and lower rails to the shaft 11, as illustrated in FIG. 5. It should also be noted that a bottom knife edge 29 extends forwardly or below the scraper blade 28 and is arranged orthogonally relative to the scraper blades 22 and spaced below the side scraper blades in the aforenoted orthogonal relationship. An elastomeric body 30 is cast about the rectangular framework 20 and encompasses the framework and the shaft portion 11 directecd through the framework, as well as the shaft portion 11 directed below the framework. The elastomeric body encompasses the framework and the scraper blade structure, with the exception of the bottom edge 29 and the parallel side knife edges 23 that are exposed and extend exteriorly of the elastomeric body.

A modified version of the invention includes the elastomeric body 30 exposing reinforcing rods, including side reinforcing rods 31 and a bottom reinforcing rod 32 in lieu of the respective parallel side knife edges 23 and the bottom knife edge 29.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, the include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A method of making a mixing tool comprising the steps of, providing a cental, elongate axially aligned shaft, and forming a rectangular rigid framework having spaced parallel vertical side rails, a lower horizontal rail and an upper horizontal rail, with the lower and upper horizontal rails arranged parallel relative to one another, securing the shaft medially of the framework spaced from a lower terminal end of the shaft;

mounting a scraper blade to each of the side rails coextensively with each side rail;

mounting a bottom scraper blade to the lower terminal end of the shaft spaced from the horizontal framework, and encasing the rectangular framework and the bottom scraper blade in an elastomeric body formed with a semi-rigid memory retentent material.

2. The method as set forth in claim 1 including the step of providing a knife edge to each side scraper blade, wherein the knife edges and arranged parallel relative to one another and coextensive with each of the side rails, and providing a bottom knife edge to the bottom scraper blade, wherein the bottom knife edges are arranged orthogonally relative to the side knife edges and spaced below the side knife edges, and wherein the step of encasing the rectangular framework and the bottom scraper blade includes the step of exposing the bottom knife edge and the parallel side knife edges for the parallel side knife edges and the bottom knife edge to extend exteriorly of the elastomeric body.

3. The method as set forth in claim 2 wherein the method includes the step of providing a first securement band about the central shaft and securing the central shaft medially of the upper horizontal rail, and providing a second securement band about the central shaft securing the central shaft to the lower horizontal rail, and providing a third securement band about the central shaft securing the central shaft to the bottom scraper blade, with the lower terminal end of the central shaft positioned medially of the bottom scraper blade and arranged orthogonally thereto.

4. The method as set forth in claim 3 including the step of directing a fastener through each securement band into the central shaft prior to encasing the framework and the bottom scraper blade in the elastomeric body.

* * * * *